(12) United States Patent
Cimatti

(10) Patent No.: US 8,353,554 B2
(45) Date of Patent: Jan. 15, 2013

(54) VEHICLE PROVIDED WITH DETACHABLE CONVERTIBLE TOP

(75) Inventor: Franco Cimatti, Pavullo (IT)

(73) Assignee: Ferrari S.p.A. (IT)

( * ) Notice: Subject to any disclaimer, the term of this patent is extended or adjusted under 35 U.S.C. 154(b) by 122 days.

(21) Appl. No.: 13/047,564

(22) Filed: Mar. 14, 2011

(65) Prior Publication Data

US 2012/0061991 A1    Mar. 15, 2012

(30) Foreign Application Priority Data

Mar. 15, 2010  (IT) .............................. BO2010A0158

(51) Int. Cl.
*B62D 25/06*    (2006.01)
(52) U.S. Cl. ........................................ 296/103; 296/102
(58) Field of Classification Search ................... 296/102, 296/103
See application file for complete search history.

(56) References Cited

U.S. PATENT DOCUMENTS

| | | | | |
|---|---|---|---|---|
| 1,778,356 A | * | 10/1930 | Coppock | 296/181.4 |
| 6,921,077 B1 | * | 7/2005 | Pupo | 296/102 |
| 2011/0221228 A1 | * | 9/2011 | Cimatti | 296/107.09 |

FOREIGN PATENT DOCUMENTS

| | | |
|---|---|---|
| DE | 10042491 A1 | 3/2002 |
| DE | 102008027616 A1 | 12/2009 |
| JP | 62015120 A * | 1/1987 |
| JP | 7-246839 A | 9/1995 |

OTHER PUBLICATIONS

"Italian Application Serial No. IT 8020100158, Search Report dated Aug. 3, 2010", 2 pgs.

* cited by examiner

*Primary Examiner* — Lori Lyjak
(74) *Attorney, Agent, or Firm* — Schwegman Lundberg & Woessner, P.A.

(57) ABSTRACT

A vehicle provided with a coachwork; an interior compartment surrounded by the coachwork and frontally delimited by a windscreen surrounded by an U-shaped molding; and a detachable convertible top, which can be connected to the coachwork in order to close the interior compartment on the top and comprises, in turn, a covering cloth and a frame which is mechanically connectable to the coachwork and supports the covering cloth; the frame comprises a rear cross member, which can be coupled to a rear portion of the coachwork arranged immediately behind the interior compartment; and an arch, which is hinged to the rear cross member in order to rotate around a first axis, can be frontally coupled to the molding of the windscreen, and determines the locking of the rear cross member to the rear portion of the coachwork due to its rotation around the first axis.

20 Claims, 5 Drawing Sheets

VEHICLE PROVIDED WITH DETACHABLE CONVERTIBLE TOP

RELATED APPLICATION

This application claims the benefit of priority under 35 U.S.C. Section 119 to Italian Patent Application Serial No. B02010A 000158, filed on Mar. 15, 2010, which is incorporated herein by reference in its entirety.

TECHNICAL FIELD

The invention relates to a vehicle provided with detachable convertible top.

In particular, the present invention relates to a vehicle provided with a coachwork, an interior compartment surrounded by the coachwork and frontally delimited by a windscreen surrounded by a "U"-shaped molding, and a detachable convertible top, which can be connected to the coachwork in order to close the interior compartment on the top and comprises, in turn, a covering cloth and a frame, which is mechanically connectable to the coachwork and supports the covering cloth.

BACKGROUND

This type of two-seat sports vehicles, better known as roadsters or also spyders, are increasingly more common in the automotive market in Europe and, above all, in the United States. Because of its characteristics, the vehicle described above is particularly common in those areas in which sunny days and warm temperatures are enjoyed for many months a year.

The detachable convertible top may be made of cloth or metal or plastic; if the vehicle is provided with a removable top made of cloth, the latter is usually accommodated within a specific compartment obtained in the coachwork and arranged outside the interior compartment.

In case of rain, the passenger of the vehicle must extract the folded detachable convertible top from the specific compartment and connect it to the coachwork to close the top of the interior compartment. The operations which must be performed to connect the detachable convertible top to the body may require several minutes and may be particularly complex if performed by only one person.

SUMMARY

Some examples provide a vehicle provided with a detachable convertible top, which is free from the drawbacks of the prior art, light, small in size, easy and cost-effective to make, and which at the same time allows to be easily connected to the vehicle by a single user.

According to the present subject matter, a vehicle provided with a detachable convertible top is provided as disclosed in the appended claims.

BRIEF DESCRIPTION OF THE DRAWINGS

The present invention will now be described with reference to the accompanying drawings, which set forth some non-limitative embodiments thereof, in which.

Figure 1:
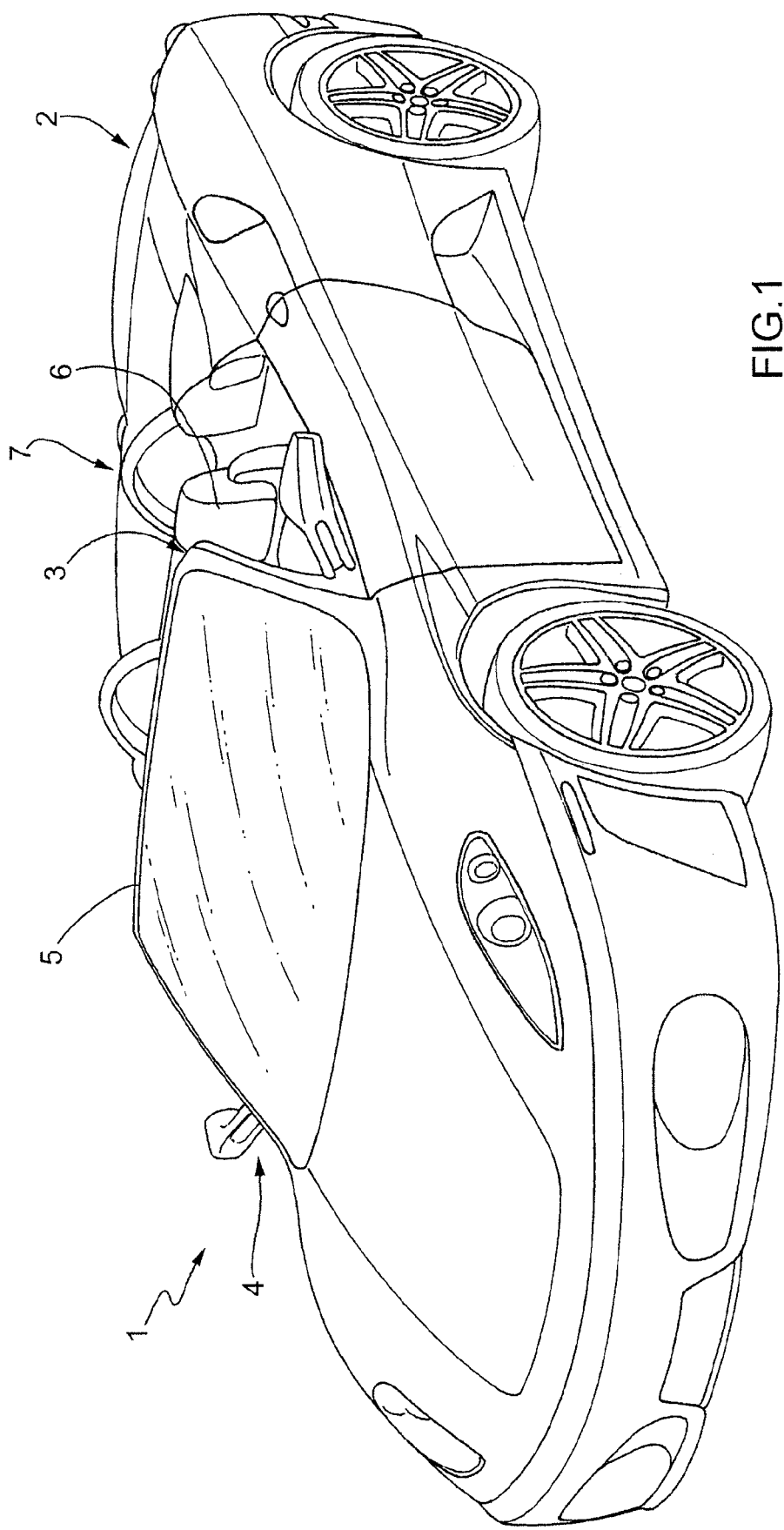
FIG. 1 is a perspective view of a vehicle made in accordance with at least one example, in which the detachable convertible top is not connected to the vehicle itself.
Figure 7:
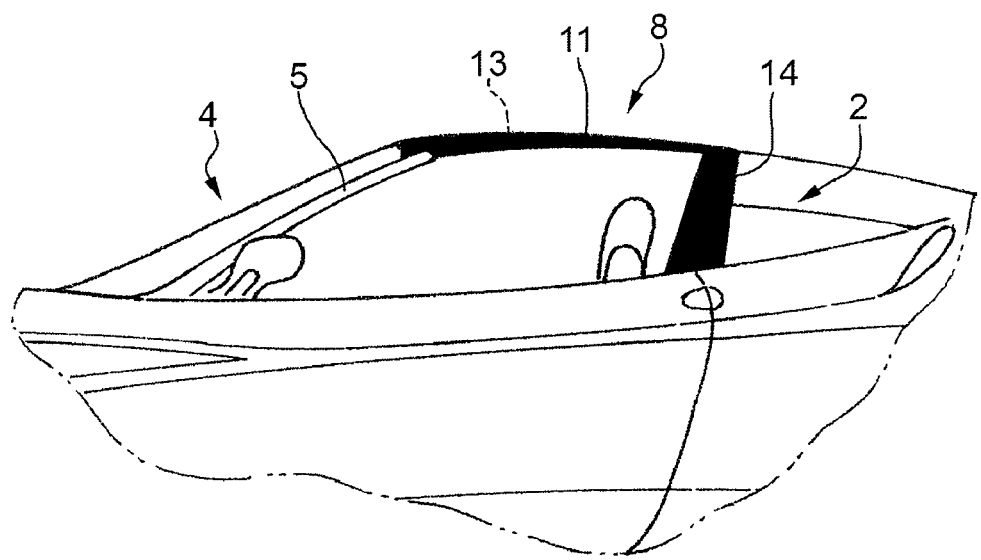
Figure 8:
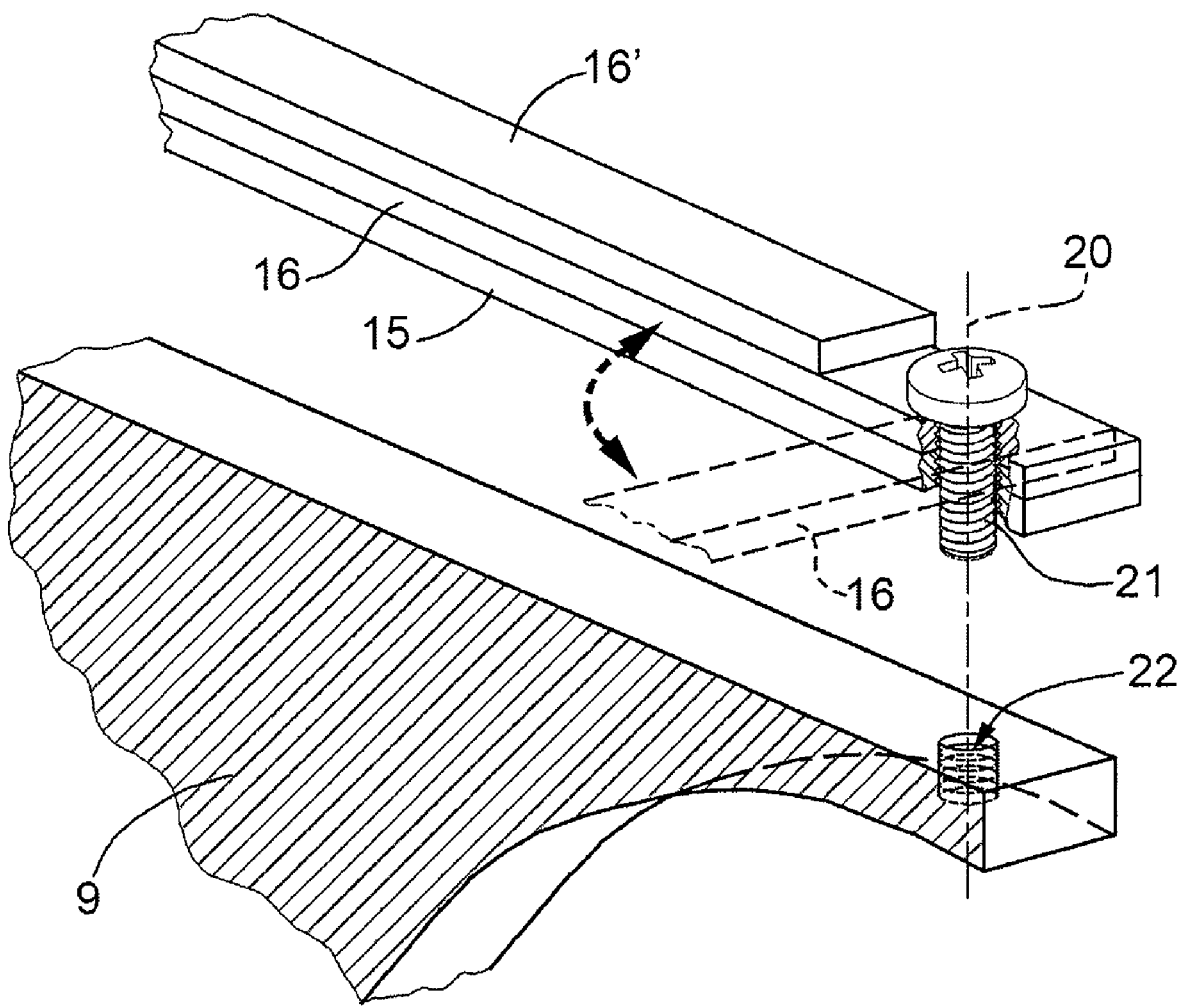

FIGS. from 2 to 6 respectively show the steps in sequence of the connection process of the detachable convertible top to the coachwork of the vehicle as shown in FIG. 1;

FIG. 7 is a side view of a detail of the vehicle in FIG. 1 with detachable convertible top connected to the vehicle itself; and FIG. 8 shows a detail of the centering means of the detachable convertible top.

DETAILED DESCRIPTION

In FIG. 1, numeral 1 indicates as a whole a road vehicle comprising a coachwork 2 and an interior compartment 3. The interior compartment 3 is surrounded by the coachwork 2, with completely open top and frontally delimited by a windscreen 4 surrounded by an "U"-shaped molding 5. Two seats 6 for accommodating two passengers are housed in the interior compartment 3.

Figure 2:
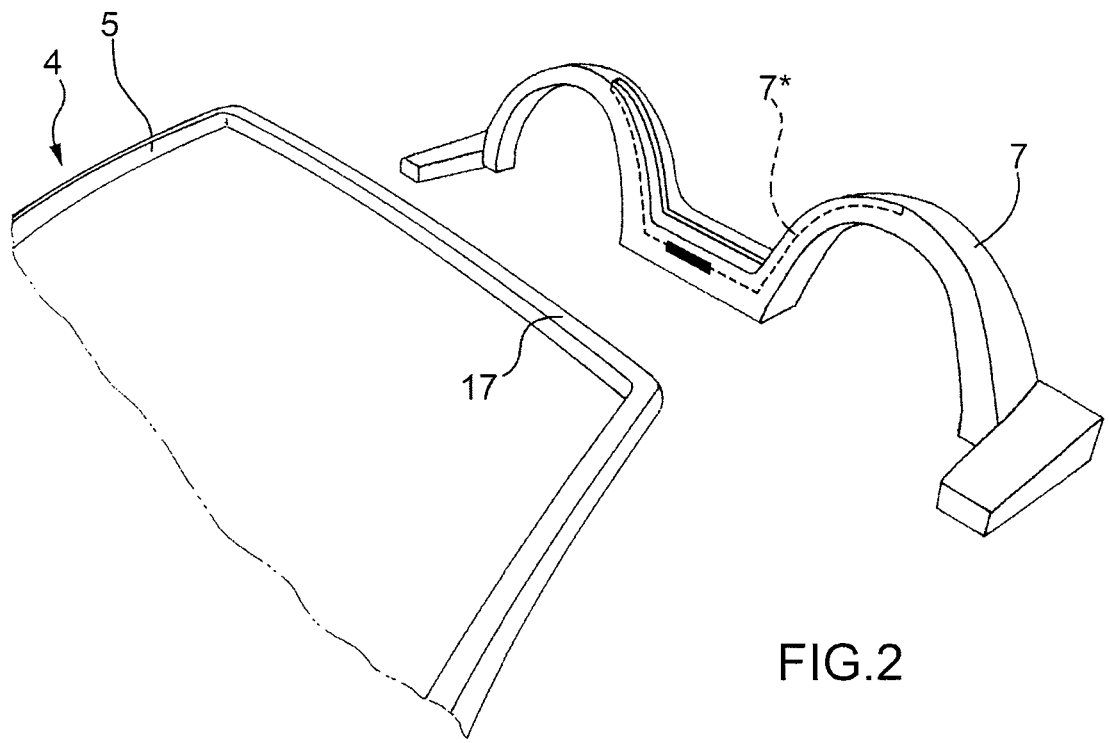

As shown in FIG. 2, the two seats 6 are protected at the back by a protective structure 7, better known as roll-bar structure 7, which is adapted to protect the passengers of vehicle 1 in case of rollover and must be able to support the weight of the vehicle 1 without breaking.

Coachwork 2 of the vehicle is arranged to be connected to a detachable convertible top 8, which is suited to define a closed position of the interior compartment 3 (shown in FIG. 7) wherein the entire passenger compartment 3 is covered by the detachable convertible top 8 itself.

When traveling with the top of interior compartment 3 open, the detachable convertible top 8 is accommodated in a specific compartment (not shown). The compartment for accommodating the detachable convertible top 8 is obtained in the coachwork 2, in a central position behind the interior compartment 3 and is closed by a lid which, in closed position, is arranged flushed with the rest of the coachwork 2.

Figure 3:
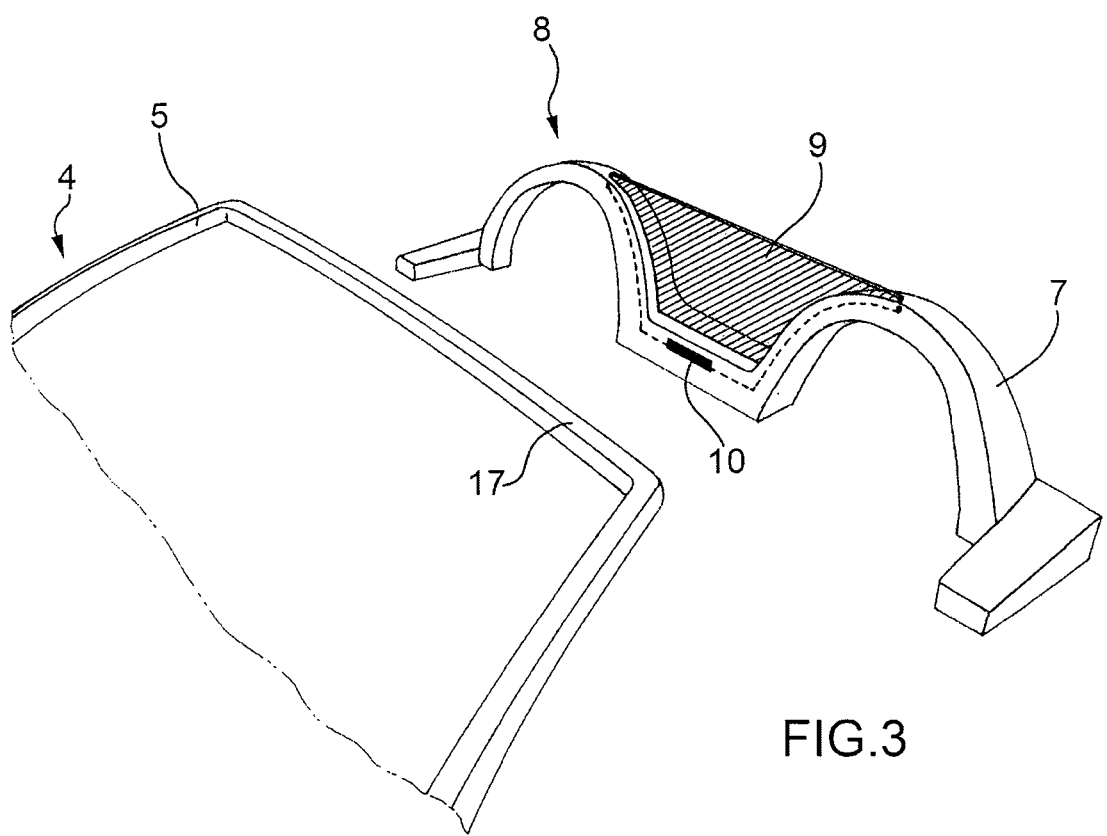

As shown in FIG. 3, the detachable convertible top 8 comprises a flat transparent panel 9, which is arranged essentially vertical (or with appropriate inclination so as to not generate annoying reflections in the inner rear-view mirror of vehicle 1) and defines a rear window 9 of the interior compartment 3 itself.

The rear window 9 is made of one or more layers of glass or other transparent material and in an example is supported by a frame.

A guide 7* for accommodating the rear window 9 is obtained in the roll-bar structure 7. In other words, guide 7* defines a seat having a profile essentially complementary to the profile of the rear window 9. For insertion, the rear window 9 slides in guide 7* to move along a vertical direction between an extracted position, in which the rear window 9 protrudes from coachwork 2, and an inserted operating position, in which the rear window 9 is inserted in the guide 7* of the coachwork 2. In the inserted operating position, a lower edge and two respective side edges of the rear window 9 are inserted in the guide 7*.

An elastic seal is inserted in the guide 7*, which in the operating inserted position of the rear window 9, is interposed between the lower and side edges of the rear window 9 and guide 7* itself, respectively.

The rear window 9 is locked on the roll-bar structure 7 by means of a fitting mechanism 10. The coupling which is obtained makes the rear window 9 easily maneuverable by passengers for both the insertion and the extraction of the rear window 9 itself.

The rear window 9 guarantees good rear visibility to the driver of vehicle 1 and protects the passengers of vehicle 1 from behind in case of wind and heavy rain.

The detachable convertible top 8 then comprises a covering cloth 11 and a supporting frame 12 which is suited to support the covering cloth 11 and is mechanically connectable to the coachwork 2. In particular, the supporting frame 12 is suited to form a connection structure between the ends of the interior compartment 3, i.e. the roll-bar structure 7 and the frame 5 of the windscreen 4.

Figure 4:
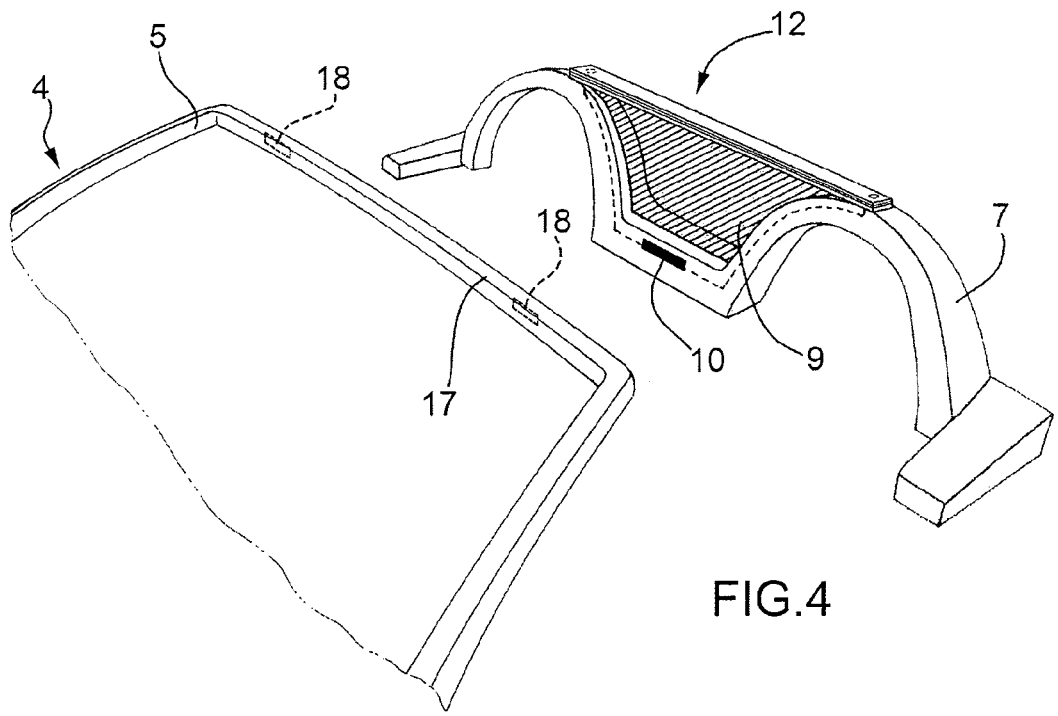
Figure 5:
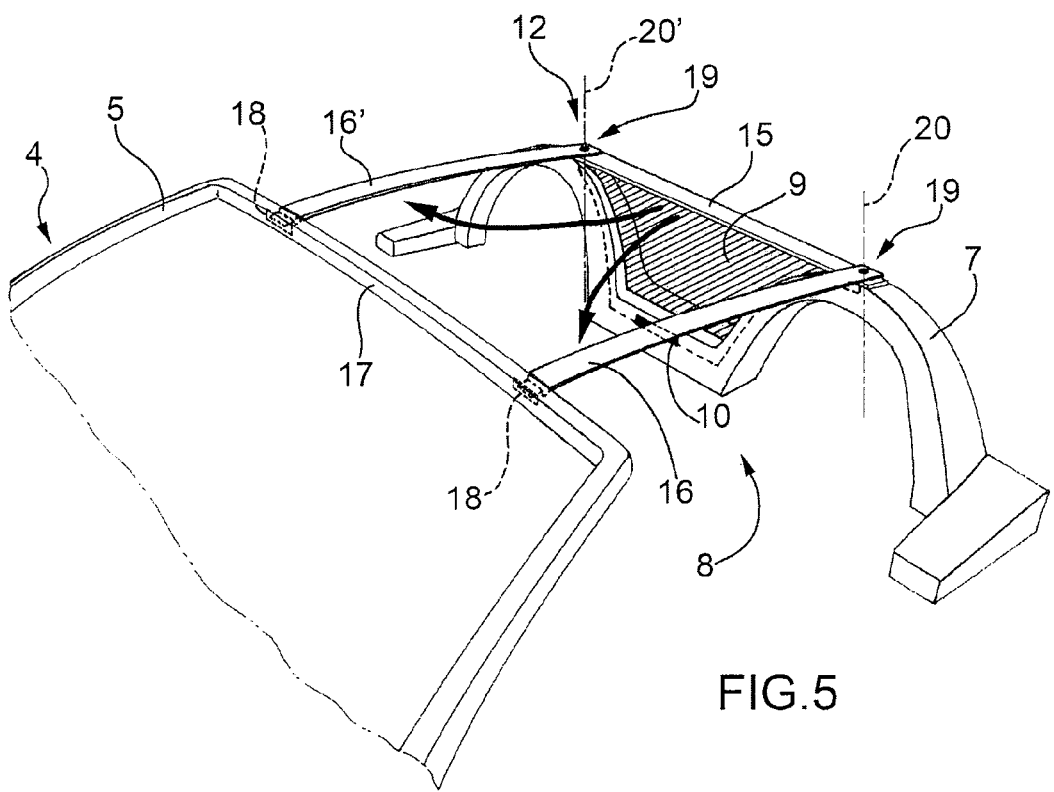

As shown in FIGS. 4 and 5, the supporting frame 12 comprises a rear cross member 15, which is connectable to an upper edge of the rear window 9. The length of the cross member 15 substantially approximates by excess the length of the upper edge of the rear window 9 so as to completely cover the rear window 9 and partially rest on the roll-bar structure 7.

The supporting frame 12 then comprises two arches, indicated by 16 and 16' respectively, which are relatively thin and hinged to respective ends of the cross member 15 at a rear end thereof.

According to further variants, not shown, the supporting frame 12 may have a different number of arches 16, as for example only one arch 16, which may be wider (in fact the arch 16 in this case is comparable to a panel 16) either hinged or resting substantially half way along the cross member 15.

As shown in FIG. 4, in a closed position of the supporting frame 12, the two arches 16 and 16' overlap on one another and on the cross member 15 so as to be arranged in a direction substantially parallel to the cross member 15.

As shown in FIG. 5, in an opening position of the supporting frame 12, the two arches 16 and 16' are instead arranged along a direction substantially orthogonal to the cross member 15. The two arches 16 and 16' thus perform a rotation of approximately 90°, such as with sense of rotation opposite to one another (counterclockwise for arch 16 and clockwise for arch 16').

The two arches 16 and 16', once arranged in orthogonal position with respect to the cross member 15, are coupled to the U-shaped frame 5 of the windscreen 4. The upper cross member 17 of the frame 5 has two seats obtained to accommodate a front free end of a respective arch 16.

The distance between the two seats 18 is equal to the distance between the two rear ends of the arches 16 and 16' hinged to the cross member 15, so that the arches 16 and 16' can be arranged orthogonally to the cross member 15 itself.

In use, a passenger of vehicle 1 must open the two arches 16 and 16', making them perform a rotation of approximately 90° and then inserting the free ends of each arch 16 and 16' in the respective seat 18. In order to allow the engagement of the seats 18, the two arches 16 and 16' are slightly deformed by arching upwards.

Finally, the detachable convertible top 8 is provided with centering means 19 for applying the supporting frame 12 (and in particular the cross member 15) in the correct position on the rear window 9 and for the subsequent locking of the cross member 15 on the rear window 9.

In particular, each arch 16 and 16' is hinged to the cross member 15 and is rotational about a respective rotation axis 20 and 20' to frontally couple to the frame 5 of the windscreen 4. The two axes 20 and 21' are substantially parallel to each other.

As better shown in FIG. 8, the centering means 19 comprise a pair of threaded pins 21 each of which is coaxial to a rotation axis 20, 20' and angularly integral with a respective arch 16, 16'. The threaded pins 21 overhangingly protrude from a lower surface of the cross member 15 and are arranged at the hinge point of each arch 16 and 16' to the cross member 15.

The centering means 19 then comprise a pair of threaded seats 22, each of which is coaxial to a respective rotation axis 20, 20'. The threaded seats 22 are obtained in an upper portion of the rear window 9.

During the connection of the detachable convertible top 8, each threaded pin 21 is inserted in a corresponding threaded seat 22 allowing a correct positioning of the cross member 15 on the rear window 9.

The rotation of approximately 90° performed by the arch 16, 16' determines a rotation of the threaded pin 21 which is screwed into the corresponding threaded seat 22 turning about its rotation axis 20, 20' along with the arch 16, 16'.

The opening of the two arches 16 and 16' thus locks the cross member 15 (and consequently the entire supporting frame 12) onto the rear window 9 by effect of the action of the centering means 19.

FIGS. from 2 to 6 show the steps that the passenger of the vehicle 1 must perform to assemble the supporting frame 12 in sequence.

After having completed the insertion of the rear window 9 and the connection of the supporting frame 12 to the rear window 9 and to the U-shaped frame 5 of the windscreen 4, the passenger of vehicle 1 extracts the cloth 11 from the specific compartment arranged immediately behind the interior compartment 3.

The cloth 11 is rolled up within the compartment to reduce its dimensions as much as possible and, after extraction, is rested on the two arches 16 and 16' and unrolled so as to be arranged substantially horizontal.

Figure 6:
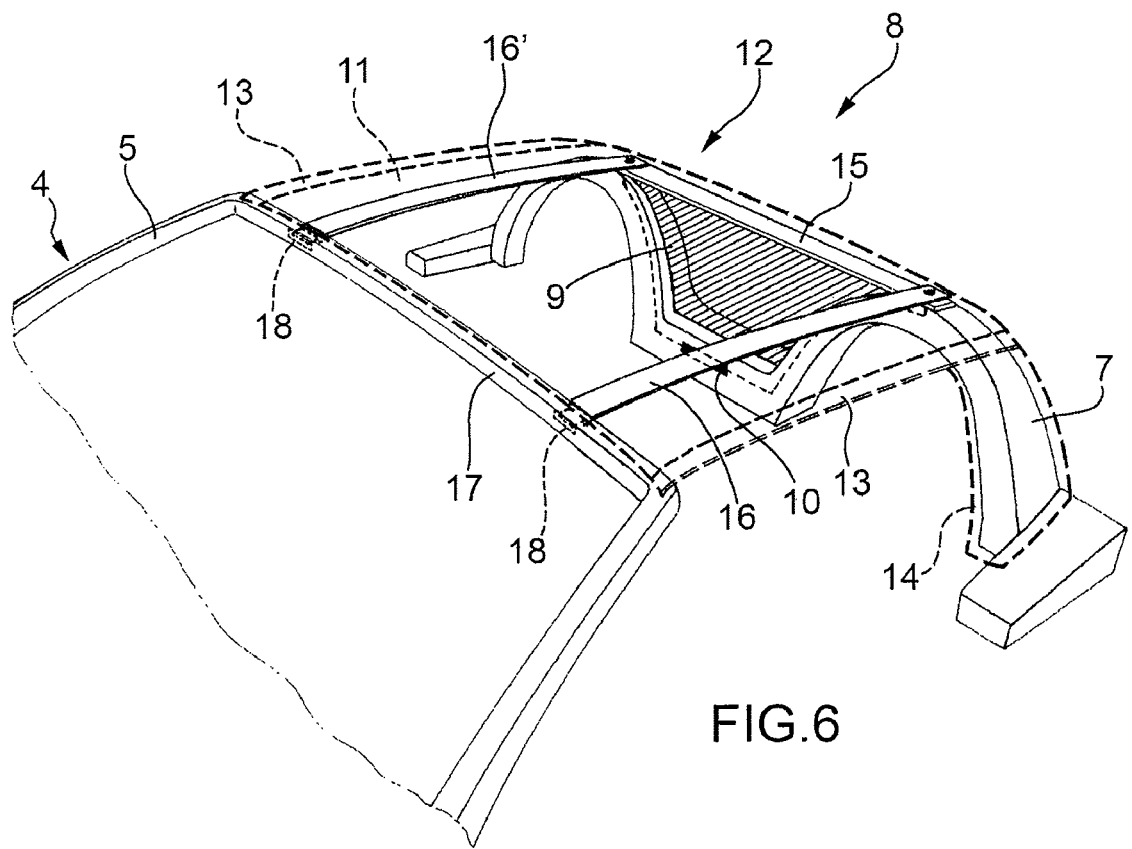

As better shown in FIG. 6, the covering cloth 11 is substantially horizontal in the closed position of the interior compartment 3 and has two side members 13 at the respective ends. Connected to the side members 13 are two appendixes 14, at one rear end thereof.

The two appendixes 14 are arranged perpendicularly to the covering cloth 11 itself, so as to be substantially vertical in the closed position of the interior compartment 3. Finally, the two appendixes 14 are connected to the coachwork 2 at the free ends thereof.

The detachable convertible top 8 described hereto has many advantages, because in the folded position it is sufficiently small to be accommodated in a small specific compartment perfectly compatible with the appearance of vehicle 1. Furthermore, the detachable convertible top 8 may be easily connected to the coachwork 2 also if the vehicle 1 is occupied by only one person who must perform all the operations in sequence alone. Finally, the rear window 9 is made of glass, with evident advantages in terms of visibility and acoustic insulation for passengers.

The invention claimed is:

1. A road vehicle comprising:
   a coachwork;
   an interior compartment surrounded by the coachwork and frontally delimited by a windscreen surrounded by an "U"-shaped molding; and
   a detachable convertible top, configured to be connected to the coachwork in order to close the interior compartment on the top, comprising:
      a covering; and
      a frame which is configured to mechanically connect to the coachwork and to support the covering cloth, wherein the frame comprises:
         a rear cross member, configured to be coupled to a rear portion of the coachwork arranged immediately behind the interior compartment; and
         at least one arch, which is hinged to the rear cross member and configured to rotate around a first axis, to be frontally coupled to the molding of the windscreen, and to connect the rear cross member to the rear portion of the coachwork when rotated around the first axis.

2. The vehicle according to claim 1, wherein the arch (16, 16') is configured to move between a closed position of the support frame in which the arch is parallel to and rests on the cross member, and an open position of the support frame in which the arch is perpendicular to the cross member to be frontally coupled to the molding of the windscreen.

3. The vehicle according to claim 2, wherein the arch is configured to perform a rotation of approximately 90° to move between the closed position and the open position.

4. The vehicle according to claim 3, wherein the molding of the windscreen comprises an upper cross member; and the upper cross member comprises, a first seat configured to receive a free end of the arch.

5. The vehicle according to claim 1, wherein the frame comprises two arches, which are hinged to the rear cross member and configured to rotate around respective rotation axis, parallel to each other.

6. The vehicle according to claim 5, wherein the molding of the windscreen comprises an upper cross member which comprises a pair of first seats, each of which is configured to receive a free end of a respective arch; with the distance between the two first seats being equal to the distance between the two rotation axis.

7. The vehicle according to claim 1, wherein the rear cross comprises centering and fixing means for connecting to the arch by positioning the rear cross member with respect to the rear portion of the coachwork and locking the rear cross member to the rear portion of the coachwork.

8. The vehicle according to claim 7, wherein the centering and fixing means comprise a pin which protrudes from the rear cross member, is configured to be inserted in a corresponding second seat disposed in the rear portion of the coachwork, is arranged coaxial to the first axis, and is rotationally fixed to the arch.

9. The vehicle according to claim 8, wherein the pin and the second seat are threaded with the pin configured to be screwed into the second seat by rotating around the first axis together with the arch.

10. The vehicle according to claim 1 and comprising a rear window which can be interposed between the rear cross member and the rear portion of the coachwork; with each arch configured to lock the rear cross member onto the rear window.

11. The vehicle of claim 1, wherein the at least one arch is configured to lock the rear cross member to the rear portion of the coachwork.

12. A system, comprising:
a coachwork;
an interior compartment surrounded by the coachwork and frontally delimited by a windscreen surrounded by an "U"-shaped molding; and
a detachable convertible top connected to the coachwork, the top comprising:
a frame connected to the coachwork;
a covering cloth supported by the frame,
wherein the frame comprises:
a rear cross member coupled to a rear portion of the coachwork behind the interior compartment; and
at least one arch rotably hinged to the rear cross member and coupled to the molding of the windscreen.

13. The system according to claim 12, wherein the arch is rotable between a closed position in which the arch is parallel to and rests on the cross member, and an open position in which the arch is perpendicular to the cross member and coupled to the molding of the windscreen.

14. The system according to claim 13, wherein the rear cross member comprises centering and fixing means for connecting to the arch by positioning the rear cross member with respect to the rear portion of the coachwork and locking the rear cross member to the rear portion of the coachwork.

15. The system according to claim 14, wherein the centering and fixing means comprise a pin which protrudes from the rear cross member, inserted in a corresponding second seat disposed in the rear portion of the coachwork, and arranged coaxial to the first axis, the pin rotationally fixed to the arch.

16. The system according to claim 15, wherein the pin and the second seat are threaded with the pin screwed into the second seat in the open position.

17. The system according to claim 13, wherein the arch is rotable approximately 90° between the closed position and the open position.

18. The system according to claim 17, wherein the molding of the windscreen comprises an upper cross member; and the upper cross member comprises a first seat coupled with a detachable portion of the arch.

19. The system according to claim 12, comprising: a rear window interposed between the rear cross member and the rear portion of the coachwork with at least one arch locking the rear cross member onto the rear window.

20. The system according to claim 12, wherein the at least one arch locks the rear cross member onto the rear portion of the coachwork.

* * * * *